United States Patent [19]
Backhaus et al.

[11] 3,919,741
[45] Nov. 18, 1975

[54] APPARATUS FOR BEHEADING FLATFISH

[75] Inventors: Horst Backhaus; Heinz Schröder, both of Lubeck, Germany

[73] Assignee: Nordischer Maschinebau Rud. Baader, Lubeck, Germany

[22] Filed: Sept. 6, 1974

[21] Appl. No.: 503,715

[30] Foreign Application Priority Data
Oct. 3, 1973 Germany............................ 2349660

[52] U.S. Cl.................................................. 17/63
[51] Int. Cl.²......................................... A22C 25/14
[58] Field of Search................ 17/59, 57, 61, 63, 60; 83/591, 594, 595

[56] References Cited
UNITED STATES PATENTS
2,479,010  8/1949  Jones...................................... 17/57

FOREIGN PATENTS OR APPLICATIONS
705,071  3/1965  Canada................................... 17/4

*Primary Examiner*—Robert Peshock
*Attorney, Agent, or Firm*—Edward F. Levy

[57] ABSTRACT

Apparatus for beheading flatfish prior to further processing in a filleting machine, the beheading comprising the separation of the head and the belly from the body of the flatfish and the apparatus including means for positioning a flatfish independent of its kind and its size, two revolving cutting knives forming a V-cut, and means for operating the revolving cutting knives.

5 Claims, 2 Drawing Figures

APPARATUS FOR BEHEADING FLATFISH

BACKGROUND OF INVENTION

1. Field of Invention

The invention relates to an apparatus for beheading flatfish comprising a horizontal support plate having a V-formed cutaway portion limited by two cutting dies, two cutting knives shearing with the cutting dies, and means for adjusting a flatfish in relation to the cutting dies including a V-formed head guide movable above the cutaway portion and fixedly coupled with body centering means for a flatfish, these centering means being movable synchronously with the head guide against the tension of spring means.

2. Description of Prior Art

Canadian Pat. No. 705 071 discloses a method of filleting fish, including the steps of preliminarily centering the fish by externally engaging the fish at several points, finally centering the fish by gripping the head from the mouth in a roofshaped embrace and beheading the fish, thereby severing the belly cavity and the ribs. In this patent the beheading operation carried out is effected by means of an angular knife, so that the belly cavity and the vertebral extensions on the vertebrae of the backbone are cut off simultaneously with the head severing operation. As a result of the centering being effected from the outer side by means of the pins or rollers, the head guide, and the angular cut the beheading cuts for all the different sizes of fish are correctly located. However, the angular knife is unsuitable for the beheading of flatfish like sole, Grey Sole, Dover Sole or similar fish. In spite of the soft or slack consistency such flatfish would be squeezed by the angular knife, which would not be able to penetrate the skin of the flatfish and cleanly separate the head with the belly from the remaining body of the flatfish.

3. Object of the Invention

It is the main object of the invention to make the beheading cut by imparting low shearing strain to the flatfish.

It is another object of the invention to impart as little compression load as possible to the flatfish by the cutting tool during the beheading process.

It is a further object of the invention to provide an apparatus for the beheading of flatfish with high output.

SUMMARY OF THE INVENTION

According to the present invention an apparatus for beheading flatfish is provided wherein the cutting knives are fixed to the free ends of two shafts pivoted in parallel relation to the support plate, disposed rectangularly to each other and each of them rotating in opposite direction of the other one, each of the cutting knives having two wings, on opposite to the other, each of the wings being provided with a cutting edge, wherein the cutting edge of one cutting knife is running ahead of the cutting edge of the other cutting knife and each cutting knife possesses a projecting lug at the ends of each of its wings, these projecting lugs crossing the cutting die and penetrating the support plate through a slot and wherein a head support arranged in the plane of the support plate is slidable into and out of the cutaway portion of the support plate and guide means are arranged above the head support on both sides of the head guide, said guide means consisting of two guiding strips and a bridge connecting the guiding strips.

One exemplified embodiment according to the invention for beheading flatfish will now be described in detail in connection with the accompanying drawing.

DESCRIPTION OF THE PREFERRED EMBODIMENT

Figure 2:
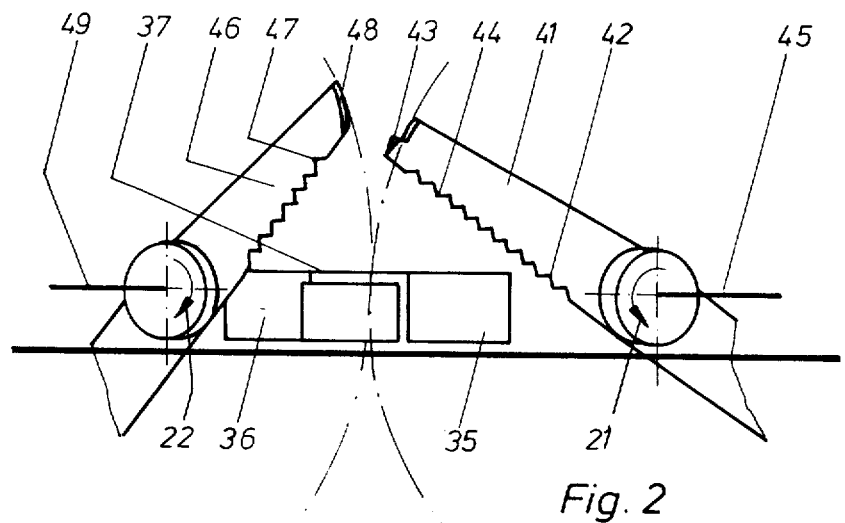
FIG. 1 is a top view of the apparatus and
FIG. 2 is an end view.

A plain support plate 1 is fixed to a machine frame (not illustrated) in a horizontal or tilted arrangement. This support plate 1 is provided with a V-formed cutaway portion 11 which is limited by two straight edges serving as cutting dies 12, 13.

Two cutter drive shafts 45, 49 are pivoted above and in parallel relation to the support plate 1 and approximately perpendicularly to each other. They are rotated in opposite directions as shown by arrows 21, 22 in any suitable manner. A cutting knife 41 is fixed to the end of drive shaft 45 and has two wings, one opposite to the other, each of which is provided with a cutting edge 42, which is serrated as shown by 44. The free ends of the wings possess projecting lugs 43 in the neighbourhood of their cutting edges 42, which are shearing with the cutting die 13. A second cutting knife 46 is fixed to the end of drive shaft 49 and has two wings one opposite to the other, each of which is also provided with a cutting edge 42, which is serrated at 47 and shearing with the cutting die 12. The free ends 48 of the two wings of cutting knife 46 are formed archlike. The two drive shafts 45, 49 are driven synchronously in a manner, that the projecting lugs 43 of the cutting knife 41 are just running ahead of the cutting edges 47 of the second cutting knife 46 and penetrate the support plate 1 through a slot 14 when they cross the cutting die 12.

A head support 15 arranged in the plane of the support plate 1 is slidable or pivotable into and out of the cutaway portion of the support plate 1. Body centering means 33, 34 for placing and centering the flatfish prior to the beheading are arranged above the surface of the support plate 1. A head centering means 32 is pivoted about an axis 16 which is situated at a right angle to the support plate 1. The cooperation of the headcentering means 32 and the body centering means 33, 34 may be realised in any suitable way, e.g., in a manner as known from the aforementioned Canadian Patent, in that the head centering means 32 may be agitated in a course shown by arrow 24, while the body centering means 33, 34 may follow the arrows 26 and 27. A head guide 31 is pivoted about the axis 16, too, and comprises a first guiding strip 35 arranged between the head centering means 32 and the rotating cutting knife 41 and a second guiding strip 36 arranged between the head centering means 32 and the rotating cutting knife 46, the upper edges of the two strips 35, 36 being connected by a bridge 37.

Figure 1:
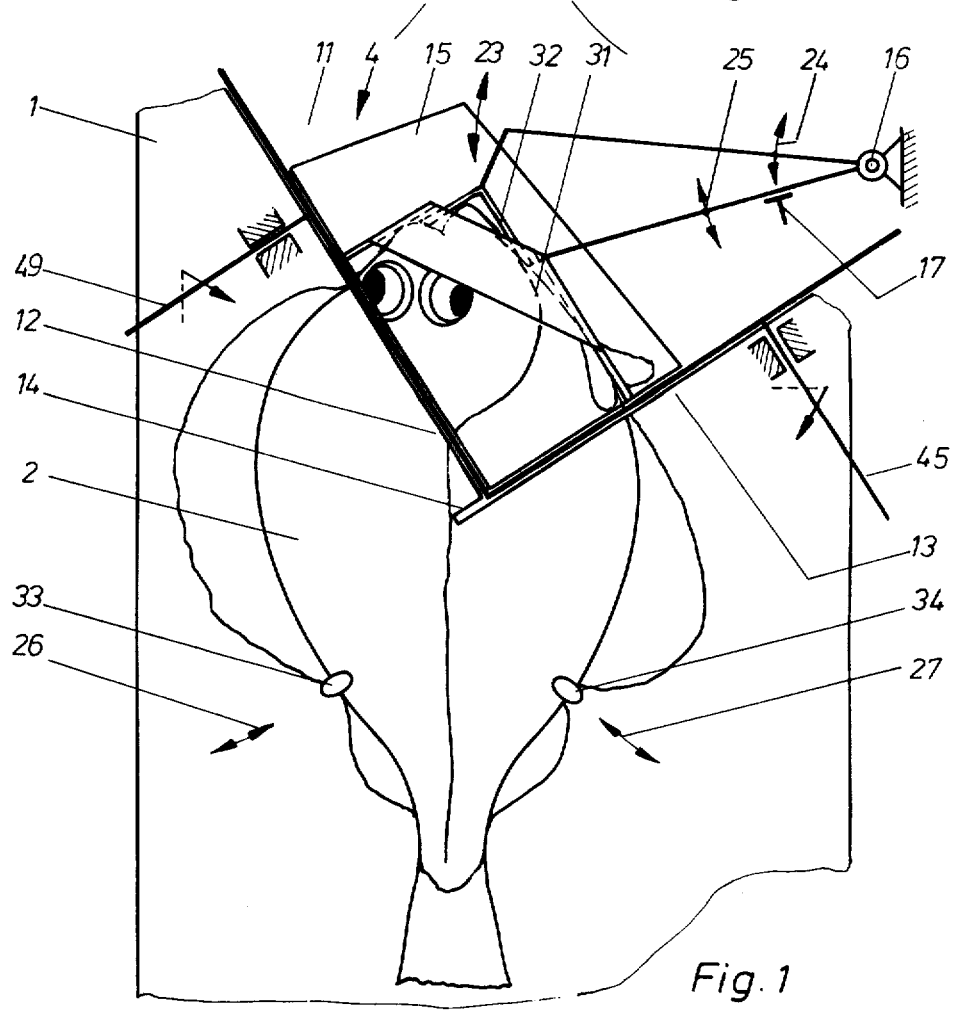

In operation of the aforedescribed apparatus the head support 15 and the head guide 31 are in a position as shown in FIG. 1 while the two wings of the head centering means 32 are brought in alignment with the guiding strips 35, 36 respectively by turning the guiding means 32 clockwise about the axis 16 against the action of a spring means not shown in the drawings. In the meantime the body centering means 33 are moved into the neighbourhood of the left edge of the support plate 1 in a path following the arc of arrow 26 while the body centering means 34 are moved into the neighbourhood of the right edge of support plate 1 in a path following the arc of arrow 27. The centering means being in a position aforedescribed, a flatfish 2 is fed onto the support plate 1. This feeding of a flatfish may be performed manually or by a conveyor, which is delivering flatfish one by one in equal orientation in a manner, that the backbones of the flatfish are in parallel relation to the left or the right edge of the support plate 1 and the head of each flatfish rests on the head support 15.

Instantly after its deposition, the settled flatfish 2 is engaged by the action of the head centering means 32 in cooperation with the body centering means 33, 34. When the centering means 32, 33, and 34 have exactly aligned the flatfish with respect to the rotating cutting knives 42, 46 in a manner that the collarbone and the skullbone are lying in the cutaway portion 11, — the collarbone just beneath the cutting die 13 and the skullbone just beneath the cutting die 12 — the rotating cutting knife 41 approaches the upper side of the flatfish with its serrated cutting edge 42 and begins its cutting operation penetrating the spines of the bellyside of the flatfish. The cutting knife 41 is instantly followed by the other cutting knife, the cutting edge 47 of which is penetrating the spines of the backside of the flatfish and its main backbone. These cuts performed in consecutive operations by the cutting edges 42, 46 with the different points of their serrations 44 exerting relatively small strain to the body of the flatfish and securing excellent separation of the skin of the body and that of the head portion of the flatfish.

When the tips of the serrations 44 of the rotating cutting knife 46 start to penetrate the skin of the upper side of the flatfish, the head centering means 32, the head guide 31, and the head support 15 are swivelled clockwise about the axis 16, thus enabling the head of the flatfish to drop down in the cutaway portion 11. In the meantime the body centering means 33, 34 are brought back to their utmost position giving way to enable expelling means not shown in the drawings to move away the body of the beheaded flatfish.

After the head support 15, the head guide 31, and the head centering means 32 aligned with the head guide 31 have returned in their starting positions the cycle may commence anew by feeding another flatfish.

What we claim as our invention and desire to secure by Letters Patent is:

1. An apparatus for beheading flatfish comprising a horizontal support plate having a V-shaped cutaway portion bordered by two rectilinear edges serving as cutting edges, a pair of cutting knives shearing with said cutting edges, a pair of rotatably-mounted shafts mounting said cutting knives at the free ends of said respective shafts, and adjusting means for holding a flatfish centered on said support plate with its head portion in selected position relative to said cutting edges, said pair of shafts being rotatably mounted parallel to the plane of said support plate and being disposed with their axes substantially perpendicular to each other, each of said shafts being rotatable in a direction opposite to each other, said cutting knives having a pair of opposed wings, each of said wings having a cutting edge, said cutting knives being rotated by said shafts in a synchronized movement in which the cutting edge of one cutting knife passes along one cutting edge of the cutaway portion in a shearing action immediately before the cutting edge of the other cutting edge passes along the other cutting edge of the cutaway portion.

2. An apparatus according to claim 1 in which one of said cutting knives has a projecting lug at the end of each of its wings, and said support plate has a slot parallel to and continuous with its cutting edge which coacts with said one cutting knife, said projecting lugs crossing the opposite cutting edge of said support plate when the knives are rotated, and penetrating through said slot whereby said cutting knives provide an uninterrupted V-shaped cut in the head of said mounted flatfish.

3. An apparatus according to claim 1 in which said adjusting means includes a V-shaped head guide movably mounted above said cutaway portion and body centering means operatively coupled with said head guide for synchronous movement therewith between a retracted position and an operative position in which it holds the fish centered on said support plate.

4. An apparatus according to claim 3 which also includes a head support disposed in the plane of said support plate, and mounted for slidable movement into and out of the cutaway portion of said support plate, and guide means arranged above said head support on both sides of said head guide.

5. An apparatus according to claim 4 in which said guide means comprises a pair of guiding strips and a bridge connecting said guiding strips.

* * * * *